United States Patent
Hwang et al.

(10) Patent No.: US 11,155,139 B2
(45) Date of Patent: Oct. 26, 2021

(54) THERMAL MANAGEMENT SYSTEM FOR VEHICLE

(71) Applicant: Hanon Systems, Daejeon (KR)

(72) Inventors: In Guk Hwang, Daejeon (KR); Sung Je Lee, Daejeon (KR); Hae Jun Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 16/766,140

(22) PCT Filed: Dec. 26, 2018

(86) PCT No.: PCT/KR2018/016626
§ 371 (c)(1),
(2) Date: May 21, 2020

(87) PCT Pub. No.: WO2019/132494
PCT Pub. Date: Jul. 4, 2019

(65) Prior Publication Data
US 2020/0361275 A1    Nov. 19, 2020

(30) Foreign Application Priority Data
Dec. 29, 2017 (KR) .................. 10-2017-0183748

(51) Int. Cl.
*B60H 3/00* (2006.01)
*B60H 1/00* (2006.01)

(52) U.S. Cl.
CPC ..... *B60H 1/00278* (2013.01); *B60H 1/00392* (2013.01); *B60H 1/00899* (2013.01);
(Continued)

(58) Field of Classification Search
CPC ............ B60H 1/00278; B60H 1/00392; B60H 1/00899; B60H 2001/00307; B60H 2001/00949
(Continued)

(56) References Cited

U.S. PATENT DOCUMENTS

| 10,457,111 B2* | 10/2019 | Gebbie ............. B60H 1/00921 |
| 2017/0054188 A1* | 2/2017 | Blatchley ........... H01M 10/613 |

FOREIGN PATENT DOCUMENTS

| KR | 101186551 B1 | 10/2012 |
| KR | 2016-0133028 A | 11/2016 |

(Continued)

OTHER PUBLICATIONS

International Search Report issued in PCT/KR2018/016626 dated Apr. 9, 2019.

*Primary Examiner* — Davis D Hwu
(74) *Attorney, Agent, or Firm* — Norton Rose Fulbright US LLP; James R. Crawford (57) ABSTRACT

Disclosed is a thermal management system for a vehicle including: a refrigerant circulation line including a refrigerant loop having a compressor, a water-cooling condenser, a first expander, an air-cooling condenser, a second expander and an evaporator, and a third expander and a chiller which are connected with the second expander and the evaporator in parallel in order to circulate refrigerant; a cooling line in which a radiator exchanging heat with the air to cool coolant, an electronic part, the chiller and a battery are connected in parallel and in which the coolant flows; and a heating line which circulates the coolant heated by exchanging heat with the refrigerant in the water-cooling condenser to heat the interior, and which is connected with the cooling line or blocked from the cooling line according to heating and cooling modes.

14 Claims, 6 Drawing Sheets

(52) U.S. Cl.
CPC .............. *B60H 2001/00307* (2013.01); *B60H 2001/00949* (2013.01)

(58) Field of Classification Search
USPC .......................................................... 165/42
See application file for complete search history.

(56) References Cited

FOREIGN PATENT DOCUMENTS

| | | |
|---|---|---|
| KR | 101703604 B1 | 2/2017 |
| KR | 2017-0094015 A | 8/2017 |
| KR | 2017-0139204 A | 12/2017 |

\* cited by examiner

THERMAL MANAGEMENT SYSTEM FOR VEHICLE

CROSS REFERENCE TO RELATED APPLICATIONS

This application is a national phase under 35 U.S.C. § 371 of International Application No. PCT/KR2018/016626 filed Dec. 26, 2018, which claims the benefit of priority from Korean Patent Application No. 10-2017-0183748, filed Dec. 29, 2017, each of which is hereby incorporated by reference in its entirety.

TECHNICAL FIELD

The present invention relates to a thermal management system, and more particularly, to a thermal management system not only for heating and cooling a vehicle but also for managing heat of electronic parts and a battery in the vehicle.

BACKGROUND ART

Recently, in the automobile fields, electric vehicles are in the spotlight as a solution of problems, such as implementation of eco-friendly technology and exhaustion of energy. The electric vehicles are small in carbon emission and noise since moving by motors which receive electric power from batteries or fuel cells. Moreover, the electric vehicles are eco-friendly since using the motors which are more excellent in energy efficiency than existing engines.

However, in case of such excellent electric vehicles, thermal management is important since using the batteries and the motors with severe heat generation, and it is also important to effectively manage hours of use of the batteries. Especially, because a compressor operating for interior air-conditioning of the electric vehicle is also operated by electric power, it is more important to manage hours of use of the batteries.

DISCLOSURE

Technical Problem

Accordingly, the present invention has been made in an effort to solve the above-mentioned problems occurring in the prior arts, and it is an object of the present invention to provide a thermal management system not only for heating and cooling a vehicle but also for managing heat of electronic parts and a battery in the vehicle. It is another object of the present invention is to provide a thermal management system, which can increase hours of use of a battery by reducing power consumption. It is a further object of the present invention is to provide a thermal management system, which includes refrigerant and coolant lines with a simple structure.

Technical Solution

To achieve the above objects, the present invention provides a thermal management system for a vehicle including: a refrigerant circulation line including a refrigerant loop having a compressor, a water-cooling condenser, a first expander, an air-cooling condenser, a second expander and an evaporator, and a third expander and a chiller which are connected with the second expander and the evaporator in parallel in order to circulate refrigerant; a cooling line in which a radiator exchanging heat with the air to cool coolant, an electronic part, the chiller and a battery are connected in parallel and in which the coolant flows; and a heating line which circulates the coolant heated by exchanging heat with the refrigerant in the water-cooling condenser to heat the interior, and which is connected with the cooling line or blocked from the cooling line according to heating and cooling modes.

Moreover, in the cooling mode where cooling load is small, the battery and the electronic part are cooled by circulation of the coolant cooled by the radiator.

Furthermore, in the cooling mode where cooling load is large, the battery is cooled by circulation of the coolant cooled by the chiller.

Additionally, in the cooling mode where cooling load is large, the electronic part is cooled by circulation of the coolant cooled by the radiator.

In addition, in the cooling mode, the cooling line and the heating line are connected with each other in a flow of the coolant.

Moreover, in the heating mode, the cooling line and the heating line are blocked from each other in the flow of the coolant.

Furthermore, in the heating mode in the mild weather, the cooling line and the heating line are connected with each other in a flow of the coolant.

Additionally, in the heating mode in the mild weather, the interior is heated by the electronic part and the battery of the cooling line.

Moreover, in the heating mode in the mild weather, a refrigerant flow of the refrigerant circulation line is stopped by a stop of the compressor.

Furthermore, in the cooling mode, the refrigerant of the evaporator exchanges heat with the air in order to cool the interior.

Additionally, the heating line includes: an electric heater for heating the coolant if temperature of the coolant heated by any one among the water-cooling condenser, the battery, and the electric component is less than a predetermined value; a heater for exchanging heat between the coolant and the air in order to heat the interior; a first direction changer for selectively connecting or blocking the heating line and the cooling line with each other or from each other; and a coolant circulator arranged between the heater and the first direction changer to circulate the coolant in the direction of the first direction changer.

Moreover, the thermal management system further includes: a first connection line connected between the cooling line and the heating line so that the coolant of the cooling line moves to the heating line; a second direction changer arranged between the cooling line and the first connection line to control the coolant flow; and a third coolant circulator arranged between the second direction changer and the heating line to circulate the coolant in the direction of the heating line.

Furthermore, a second connection line is connected between the first connection line and the cooling line so that the coolant of the first connection line moves to the cooling line, and the electronic part is arranged in the second connection line.

Additionally, the thermal management system further includes: a second coolant circulator arranged between the battery of the cooling line and the second direction changer to circulate the coolant in the direction of the second direction changer.

Advantageous Effects

The thermal management system according to the present invention can increase hours of use of the battery by reducing power consumption and reduce maintenance fees and the production cost since including refrigerant and coolant lines with a simple structure.

MODE FOR INVENTION

In order to fully understand the present invention, exemplary embodiments of the invention will be described with reference to the accompanying drawings. The embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. In the drawings, the shapes and dimensions may be exaggerated for clarity, and the same reference numerals will be used throughout to designate the same or like components. A detailed explanation of known related functions and constitutions may be omitted to avoid unnecessarily obscuring the subject matter of the present invention.

Figure 1:
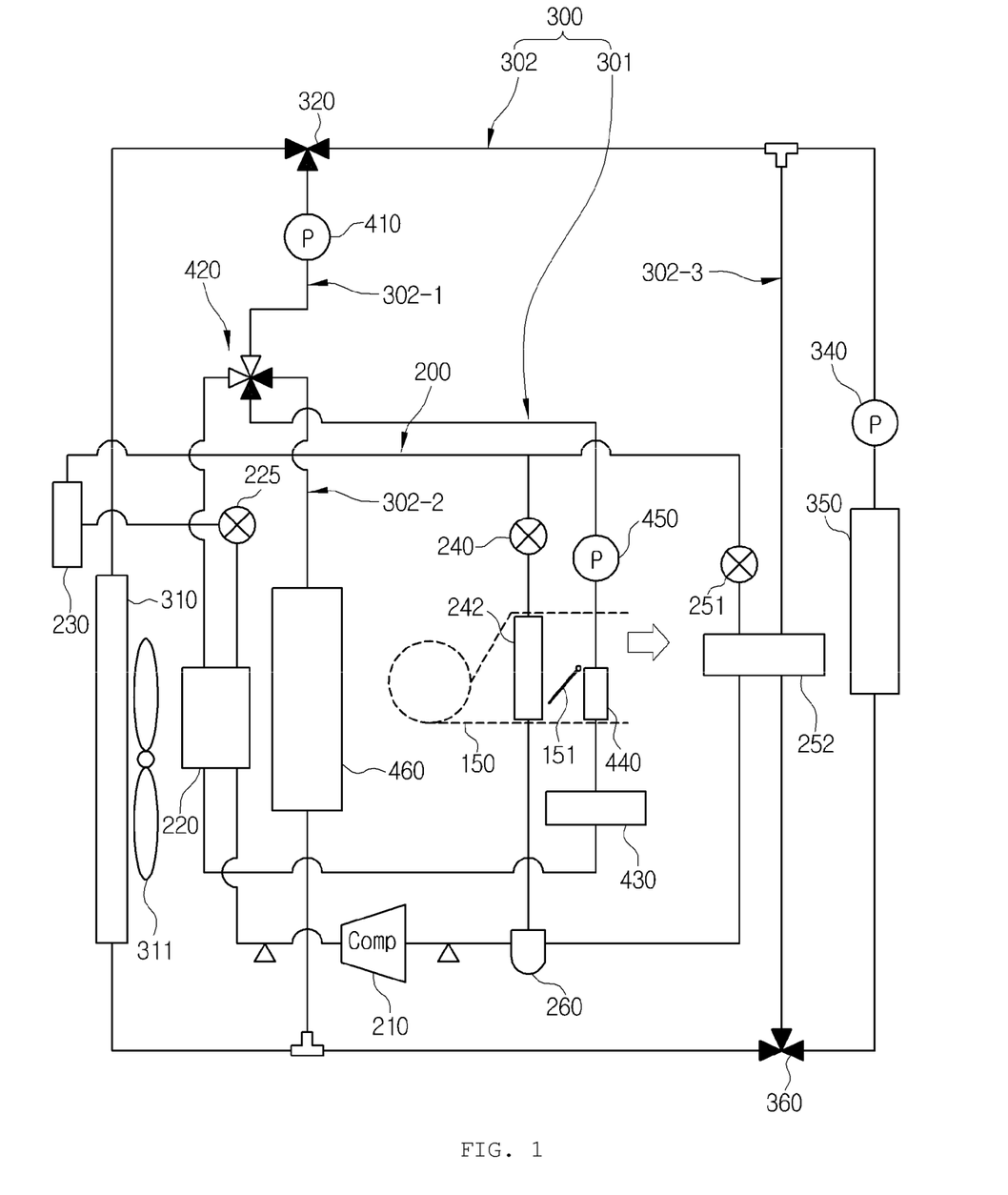
FIG. 1 is a configurative diagram of a thermal management system according to an embodiment of the present invention.

FIG. 1 is a configurative diagram of a thermal management system according to an embodiment of the present invention.

As shown in FIG. 1, the thermal management system includes a refrigerant circulation line 200 in which refrigerant circulates and a coolant circulation line 300 in which coolant circulates.

The refrigerant circulation line 200 includes a compressor 210, a water-cooling condenser 220, an air-cooling condenser 230, an evaporator 242, a chiller 252, first to third expanders 225, 240 and 251, and an accumulator 260. The above-mentioned components will be described as follows.

The compressor 210 serves as a heat to circulate refrigerant in the refrigerant circulation line 200. For example, the compressor 210 may be an electrically-driven compressor. Hereinafter, the refrigerant circulator and the electrically-driven compressor which have the same reference numeral 210 will be described. The electrically-driven compressor which is the compressor 210 compresses and discharges refrigerant by receiving electric power, and is divided into a scroll type, a swash type, a rotary type and a wobble type according to compression forms. In this embodiment, all of the types are applicable regardless of the compression form of the compressor.

The heat exchangers 220, 230, 242 and 252 serve to exchange heat between the refrigerant and other mediums, such as coolant or air. Furthermore, the first to third expanders 225, 240 and 251 serve to throttle the refrigerant, make the refrigerant bypass or block a flow of the refrigerant.

The water-cooling condenser 220 serves as a condenser in the refrigerant circulation line 200. That is, the first heat exchanger 220 receives refrigerant of high temperature and high pressure discharged from the refrigerant circulator 210 and exchanges heat between the refrigerant and coolant in order to lower temperature of the refrigerant.

The first expander 225 is arranged between the first and second heat exchangers 220 and 230 to throttle the refrigerant or make the refrigerant bypass. For this, the first expander 225 may have a form that an orifice and a bypass circuit connected to a front end and a rear end of the orifice are combined with each other, or a thermal expansion valve (TXV) or an electronic expansion valve (EXV). The first expander 225 changes its function according to whether the refrigerant circulation line 200 is used as an air-conditioning loop or a heat pump loop. If the refrigerant circulation line 200 is used as an air-conditioning loop, the first expander 225 makes the refrigerant bypass, and if the refrigerant circulation line 200 is used as the heat pump loop, the first expander 225 throttles the refrigerant and makes the refrigerant pass.

In link with the first expander 225, the air-cooling condenser 230 serves as a condenser or an evaporator in the refrigerant circulation line 200. For this, the air-cooling condenser 230 may be designed to have a structure of exchanging heat between air and refrigerant. The air-cooling condenser 230 is varied in function depending on the role of the first expander 225. That is, if the first expander 225 makes the refrigerant bypass (it may be the air-conditioning loop), the air-cooling condenser 230 serves as a condenser together with the water-cooling condenser 220, and if the first expander 225 throttles the refrigerant (it may be the heat pump loop), the second heat exchanger 230 serves as an evaporator.

The second expander 240 is arranged between the air-cooling condenser 230 and the evaporator 242 in order to throttle the refrigerant or make the refrigerant bypass. The second expander 240 may have the form that an orifice and a bypass circuit connected to a front end and a rear end of the orifice are combined with each other, or the TXV or the EXV. The second expander 240 also changes its function according to whether the refrigerant circulation line 200 is used as an air-conditioning loop or a heat pump loop. If the refrigerant circulation line 200 is used as an air-conditioning loop, the second expander 240 throttles the refrigerant and makes the refrigerant pass, and if the refrigerant circulation line 200 is used as the heat pump loop, the second expander 240 makes the refrigerant bypass or blocks the refrigerant.

The evaporator 242 is disposed in an air conditioner 150, which may be a heating, ventilating and air-conditioning (HVAC) system for a vehicle, and serves as an evaporator. The evaporator 242 may be designed to have a structure of exchanging heat between refrigerant and air supplied into the interior of the vehicle. Moreover, the evaporator 242 serves as an evaporator if the refrigerant circulation line 200 is the air-conditioning loop, and serves as an evaporator or a refrigerant movement path or bypass (in this instance, the evaporator 242 also serves as the evaporator) if the refrigerant circulation line 200 is the heat pump loop. Here, when the refrigerant circulation line 200 is the heat pump loop, because outside air temperature is low, it needs interior heating. In this instance, the evaporator is restricted to dehumidification only. Therefore, the evaporator 242 serves only as the evaporator for dehumidification and the movement path of the refrigerant if the refrigerant circulation line 200 is the heat pump loop. Additionally, the air conditioner 150 may include a temperature adjusting door 151.

The third expander 251 is arranged between the air-cooling condenser 230 and the chiller 252 to throttle the refrigerant or make the refrigerant bypass. The third expander 251 may have the form that an orifice and a bypass circuit connected to a front end and a rear end of the orifice are combined with each other, or the TXV or the EXV. The third expander 251 throttles the refrigerant and makes the refrigerant pass when it is necessary to cool coolant, and makes the refrigerant bypass or block circulation of the refrigerant when it is not necessary to cool the coolant.

In link with the third expander 251, the chiller 252 serves as a chiller in the refrigerant circulation line 200. The fourth heat exchanger 252 may be designed as a structure of exchanging heat between coolant and refrigerant.

The accumulator 260 is arranged between the evaporator 242 and the chiller 252 and the compressor 210 in order to separate gas-phase refrigerant from liquid-phase refrigerant and transfer only the gas-phase refrigerant to the compressor 210.

The coolant circulation line 300 includes a heating line 301 for heating the interior and a cooling line 302 for cooling a battery 350 or electronic parts 460. In this instance, the heating line 301 includes an electric heater 430, a heater 440, a coolant circulator 450, and a first direction changer 420.

The electric heater 430 is a device for heating coolant, and is connected with a discharge terminal of the water-cooling condenser 220. The electric heater 430 may be an induction heater, a sheath, a PTC heater, or a thin film (TF) heater, which is operated when temperature of coolant heated by the water-cooling condenser 220 or the battery 350 and the electronic parts 460 is below a predetermined value.

The heater 440 is disposed in the air conditioner 150 to serve as a heater core. That is, the heater 440 serves to heat the interior by exchanging heat between the coolant and the air supplied to the interior.

The coolant circulator 450 is a device for circulating the coolant, and may be in a pump type. A coolant circulation direction of the coolant circulator 450 is set in a connection direction of the electric heater 430 and the heater 440. The coolant circulator 450 is operated such that the coolant passes the electric heater 430 to face the heater 440. Therefore, as shown in the drawings, if the coolant circulator 450 is located at the rear end of the heater 440, the coolant moves in the opposite direction to the direction of the heater 440. If the coolant circulator 450 is located at the front end of the electric heater 430, the coolant moves in the direction of the electric heater 430.

The first direction changer 420 serves to selectively connect or block the heating line 301 and the cooling line 302. The first direction changer 420 may be a four-way valve. The selective connection of the first direction changer 420 is achieved according to operation modes of the thermal management system, and a detailed description of the selective connection will be described later.

The cooling line 302 includes the battery 350, a radiator 310, a second coolant circulator 340, and second and third direction changers 320 and 360. Additionally, the cooling line 302 further includes first to third connection lines 302-1, 302-2, and 302-3, and a third coolant circulator 340.

The battery 350 is a power source for the vehicle and is a power source for various electronic parts in the vehicle. As occasion demands, the battery 350 is connected with a fuel cell to store electric power or to store electric power supplied from the outside.

The radiator 310 serves as a radiator for cooling the coolant. That is, the radiator 310 exchanges heat between the coolant and the air in order to cool the coolant heated by the battery 350 and the electronic parts 460. The radiator 310 may be disposed together with a fan 311 in order to increase an air supply amount. In the meantime, the air-cooling condenser 230 which exchanges heat between the refrigerant and the air may be also disposed together with the fan 311 in order to increase efficiency more. In order to occupy the minimum space, the air-cooling condenser 230 and the radiator 310 are put on another, and then, may be disposed together with the fan 311.

The second coolant circulator 340 serves to circulate the coolant of the cooling line 302, and may be in a pump type.

The second direction changer 320 serves to connect the cooling line 302 and the heating line 301 with each other. The thermal management system connects or blocks the cooling line 302 and the heating line 301 with each other or from each other according to the operation mode, and the first control is achieved by the second direction changer 320 so that the cooling line 302 and the heating line 301 are connected with each other or blocked from each other through the first connection line 302-1. Moreover, because it is difficult for the second direction changer 320 to control a flow speed of the coolant, the third coolant circulator 410 is arranged on the first connection line 302-1. In this instance, the second direction changer 320 may be a three-way valve.

Additionally, because the coolant of the heating line 301 must move toward the cooling line 302 in a state where a passage, namely, the first connection line 302-1, in which the coolant of the cooling line 302 moves toward the heating line 301 is secured, the second connection 302-2 is disposed. In this instance, an electronic part 460 is arranged in the second connection line 302-2 in order to cool the coolant.

Finally, the third connection line 302-3 is connected with the chiller 252 in order to cool the coolant, and it is determined by the third direction changer 360 whether the fourth heat exchanger 252 is connected or not. The third connection line 302-3 may be omitted if necessary, and in this instance, may have the form that the chiller 252 directly exchanges heat with the coolant of the cooling line 302 near the battery 350.

As described above, the coolant circulation line 300 according to the embodiment of the present invention connects the heating line 301 disposed for interior heating according to the operation mode of the thermal management system with the cooling line 302 for cooling the battery 350 and the electronic part 460 or blocks the heating line 301 from the cooling line 302. The first and second direction changers 420 and 320 make it possible. Especially, because the first direction changer 420 is the four-way valve for connecting and blocking the heating line 301 and the first and second connection lines 302-1 and 302-2 with each other and from each other, the heating line 301 and the cooling line 302 can be easily connected with each other and blocked from each other through the simple structure. Moreover, the simple structure can reduce the number of the direction changers for changing a flow of the coolant.

Hereinafter, an operation of the thermal management system according to the operation modes will be described. Especially, in all operation modes which will be described later, the refrigerant circulation line 200 makes the refrigerant flow in the same direction, and does not have additional direction changer.

1. Interior Heating—when Cooling Load is Small, for Instance, in Spring/Fall

Figure 2:
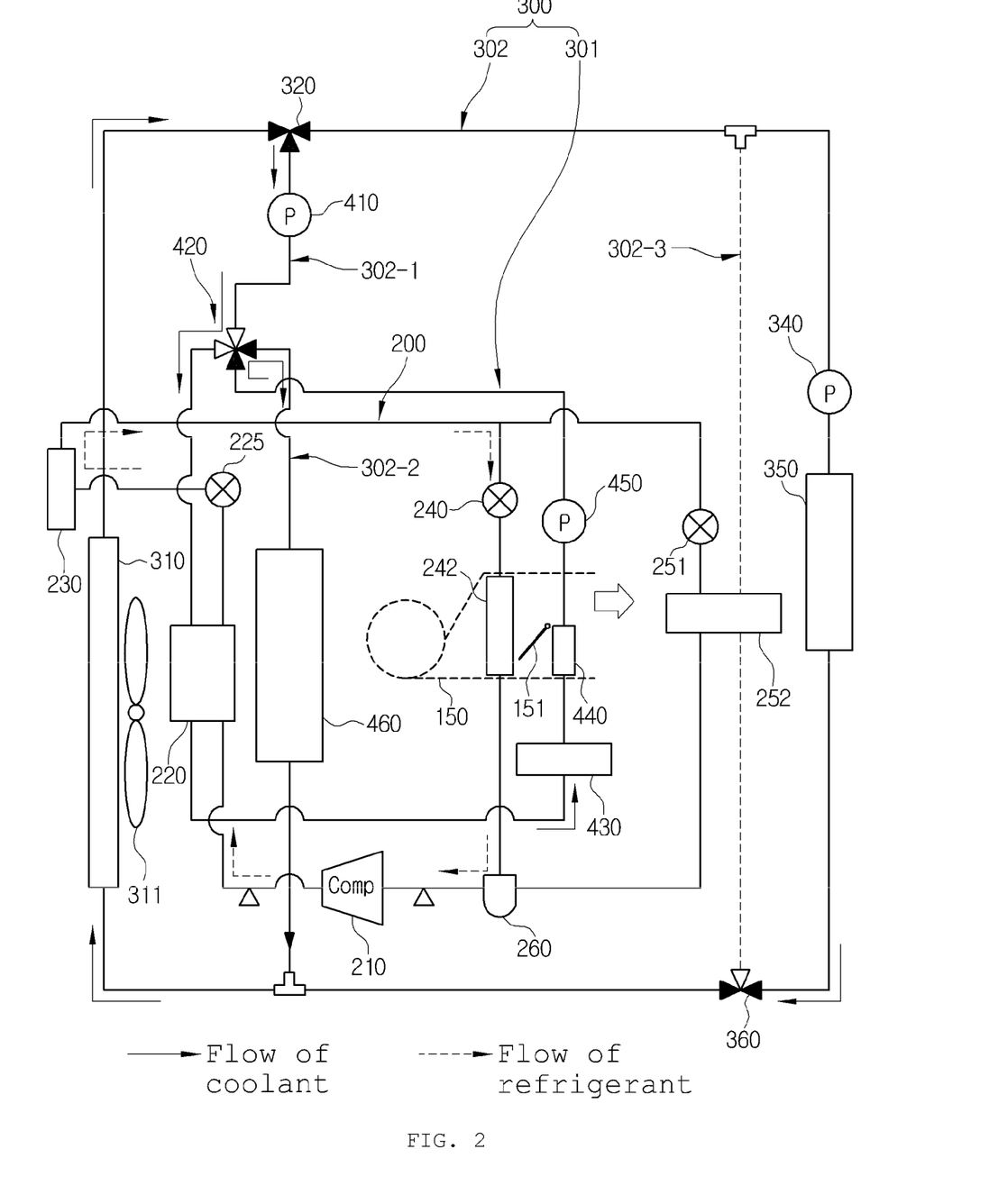
FIG. 2 is a view for explaining an interior cooling mode of the thermal management system shown on FIG. 1.

FIG. 2 is a view for explaining an interior cooling mode of the thermal management system shown in FIG. 1.

In the interior cooling mode, the compressor 210 is operated. In this instance, because cooling load is small, the compressor 210 is operated at low RPM. It means that power consumption is reduced. Continuously, refrigerant of high temperature and high pressure is discharged according to the operation of the compressor 210, and the refrigerant is cooled by exchanging heat with the coolant in the water-cooling condenser 220. Next, the first expander 225 makes the refrigerant bypass and transfers the refrigerant to the air-cooling condenser 230, and the air-cooling condenser 230 exchanges heat between the refrigerant and the air in order to cool the refrigerant further. That is, the water-cooling condenser 220 and the air-cooling condenser 230 serve as condensers to condense the refrigerant.

Continuously, the second expander 240 throttles the refrigerant, and the evaporator 242 evaporates the refrigerant in order to cool the interior. Furthermore, the third expander 251 blocks the flow of the refrigerant to prevent the refrigerant from flowing in the direction of the chiller 252. After that, the refrigerant passes the accumulator 260, and then, is transferred to the compressor 210 so as to repeat the above-mentioned operation and circulate the above cycle.

Meanwhile, the coolant circulates by the coolant circulators 340, 410 and 450 and absorbs heat of the battery 350, the electronic part 460 and the water-cooling condenser 220 to be heated. On the contrary, the refrigerants of the battery 350, the electronic part 460 and the water-cooling condenser 220 are cooled by the coolant. In this instance, the first direction changer 420 circulates the coolant in the direction to connect the heating line 301 and the cooling line 302 with each other, so that a heating source, such as the battery 350, the electronic part 460 and the water-cooling condenser 220, is connected by the coolant. That is, the first direction changer 420 simplifies the coolant line and induces the flow of the coolant in a direction to increase cooling efficiency of the heating sources 350, 460 and 220.

The heated coolant is cooled by exchanging heat with the air in the radiator 310, and is transferred to the battery 350, the electronic part 460 and the water-cooling condenser 220 in order to cool the battery 350, the electronic part 460 and the water-cooling condenser 220. The above-mentioned cycle is repeated.

In summary, interior cooling is achieved by the air-conditioning loop including the compressor 210, the water-cooling condenser 220 serving as a condenser, the air-cooling condenser 230, the second expander 240, and the evaporator 242 serving as an evaporator, which are connected in order. In this instance, because condensation of the refrigerant is achieved doubly, namely, water-cooling and air-cooling, condensation efficiency is high. Additionally, cooling of the heating sources, which are the battery 350 and the electronic part 460, is achieved by air-cooling through the radiator 310. As assumed above, because the cooling load of the heating sources 350 and 460, especially, the battery 350, is small, the heating sources 350 and 460 are cooled by air-cooling. In this instance, because there is no need to operate the chiller 252, refrigerant load gets smaller, so that RPM of the compressor 210 can be reduced. That is, as described above, power consumption can be reduced.

2. Maximum Interior Heating—When Cooling Load is Large, for Instance, in Summer

Figure 3:
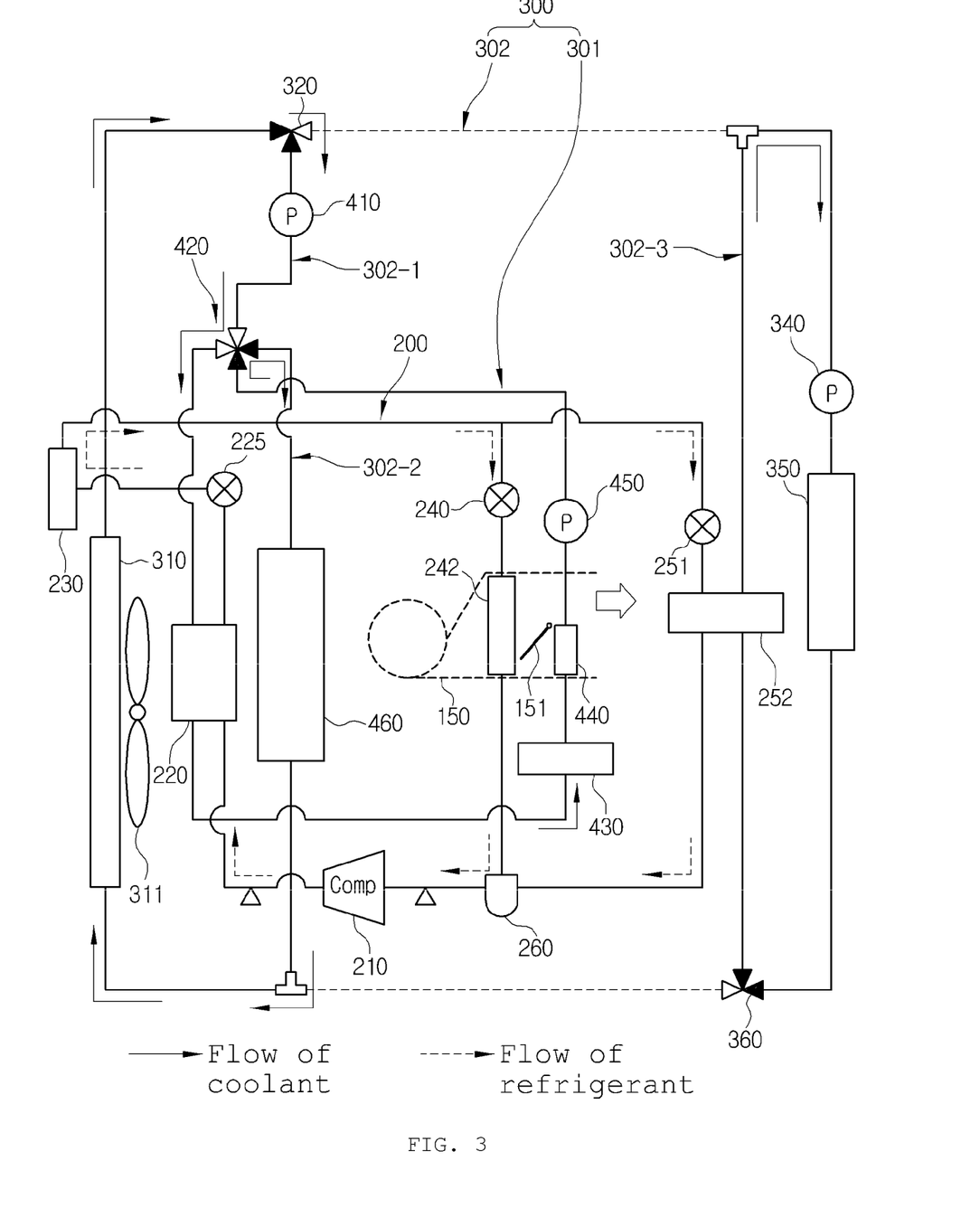
FIG. 3 is a view for explaining an interior cooling mode of the thermal management system shown on FIG. 1.

FIG. 3 is a view for explaining an interior cooling mode of the thermal management system shown in FIG. 1, and in this instance, description of duplication of the contents of FIG. 2 will be omitted.

In the interior cooling mode, the compressor 210 is operated. Because cooling load is large, the compressor 210 is operated at high RPM. Continuously, refrigerant of high temperature and high pressure is discharged according to the operation of the compressor 210, and the refrigerant is cooled by exchanging heat with the coolant in the water-cooling condenser 220. Next, the first expander 225 makes the refrigerant bypass and transfers the refrigerant to the air-cooling condenser 230, and the air-cooling condenser 230 exchanges heat between the refrigerant and the air in order to cool the refrigerant further. That is, the water-cooling condenser 220 and the air-cooling condenser 230 serve as the condensers to condense the refrigerant.

Continuously, the second expander 240 throttles the refrigerant, and the evaporator 242 evaporates the refrigerant in order to cool the interior. Furthermore, the third expander 251 throttles the refrigerant, and the chiller 252 exchanges heat between the refrigerant and the coolant. That is, the chiller 252 cools the coolant by the refrigerant. After that, the refrigerant passes the accumulator 260, and then, is transferred to the compressor 210 so as to repeat the above-mentioned operation and circulate the above cycle.

Meanwhile, the coolant circulates by the second coolant circulator 340, the third coolant circulator 410 and the coolant circulator 450 and absorbs heat of the battery 350, the electronic part 460 and the water-cooling condenser 220 to be heated. On the contrary, the refrigerants of the battery 350, the electronic part 460 and the water-cooling condenser 220 are cooled by the coolant. In this instance, the cooling line 302 is divided into the first connection line 302-1 for cooling the refrigerants of the electronic part 460 and the water-cooling condenser 220 by the second and third direction changers 320 and 360 and the second connection line 302-2 for cooling the battery 350. It is effective to use refrigerant to cool the coolant, but when the battery 350, the electronic part 460 and the water-cooling condenser 220, which are the heating sources, are cooled by the refrigerant, load is applied to the refrigerant, and it has a bad influence to the interior cooling. In order prevent the bad influence, only the battery 350 is cooled with the refrigerant, and the electronic part 460 and the water-cooling condenser 220, which are the remaining heating sources, are cooled by the radiator, which is the radiator 310.

In summary, interior cooling is achieved by the air-conditioning loop including the compressor 210, the water-cooling condenser 220 serving as a condenser, the air-cooling condenser 230, the second expander 240, and the evaporator 242, which are connected in order. Additionally, cooling of the electronic part 460 among the heating sources is achieved by air-cooling through the radiator 310, and the battery 350 is cooled with the refrigerant by the chiller 252.

3. Interior Heating

Figure 4:
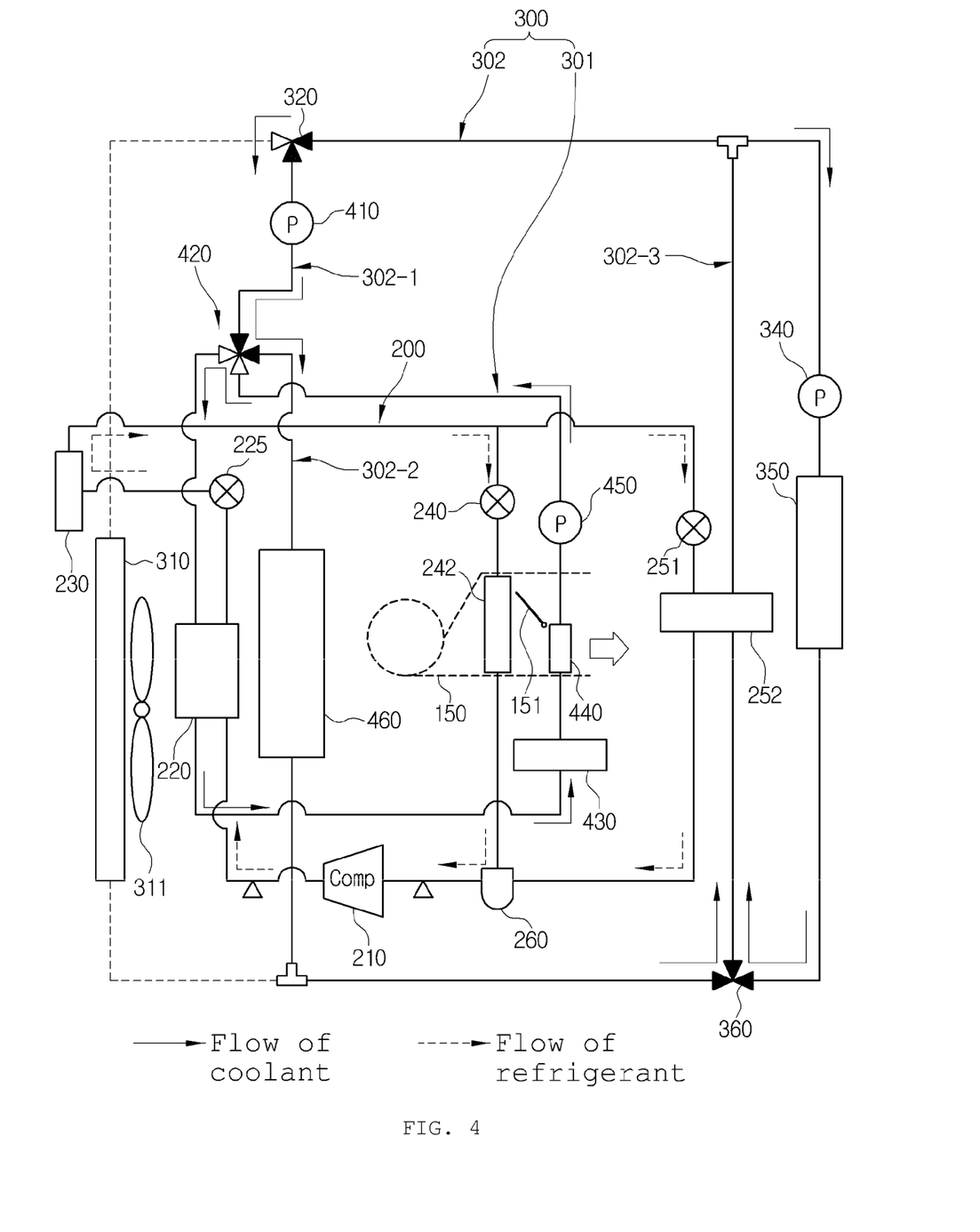
FIG. 4 is a view for explaining an interior heating mode of the thermal management system shown on FIG. 1.
Figure 5:
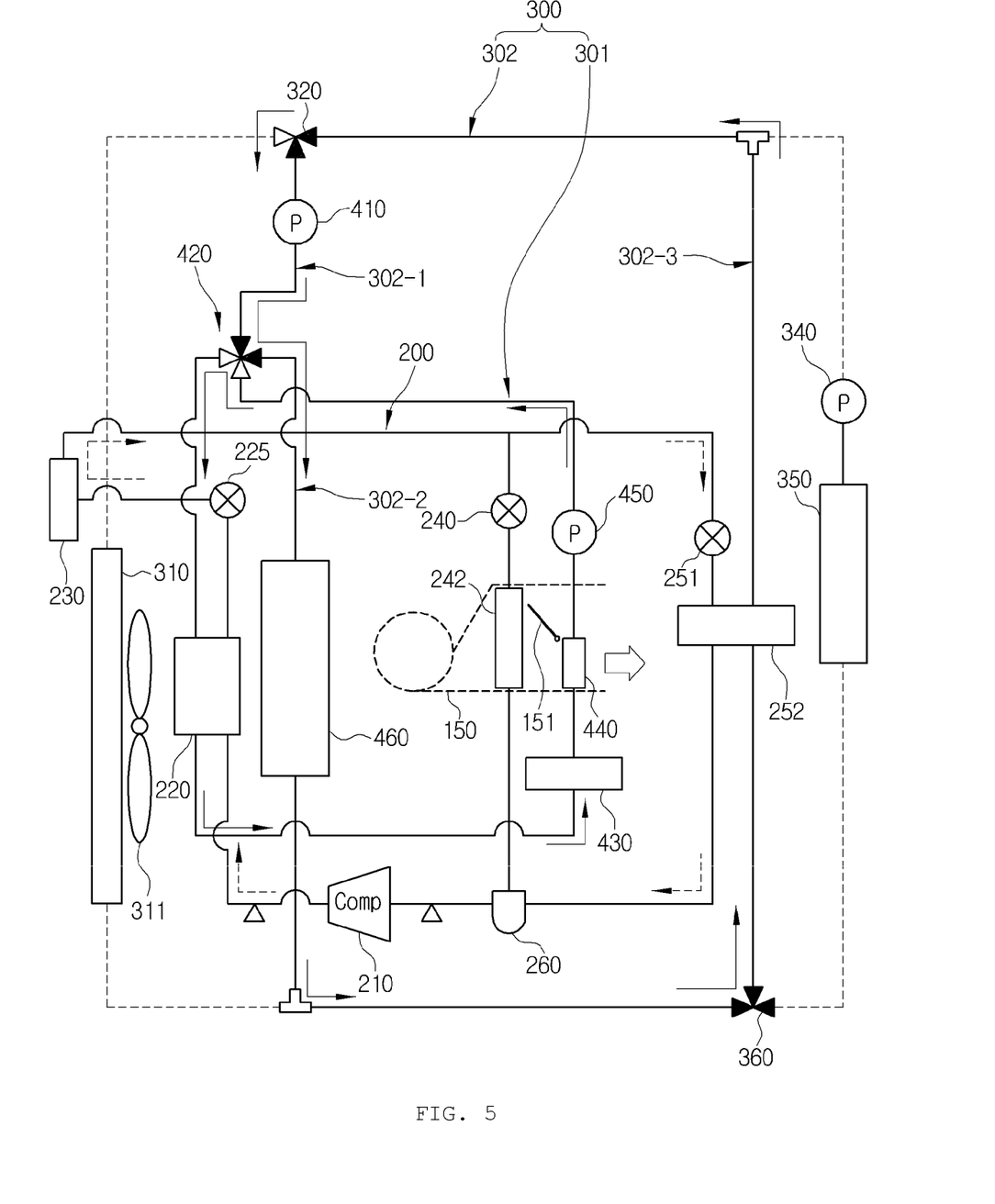
FIG. 5 is a view for explaining an interior heating mode of the thermal management system shown on FIG. 1.
Figure 6:
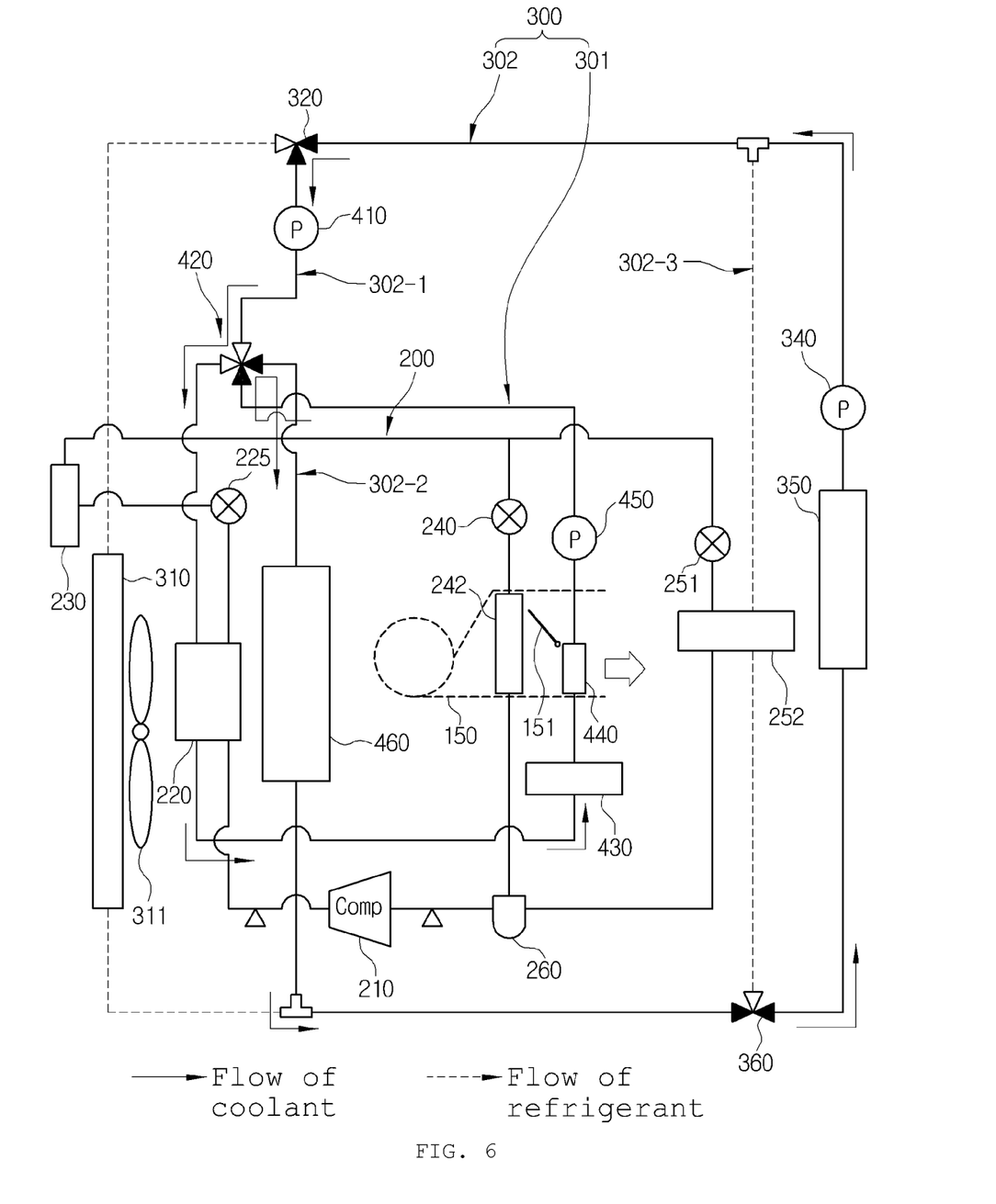
FIG. 6 is a view for explaining an interior heating mode of the thermal management system shown on FIG. 1.

FIGS. 4 to 6 are views for explaining an interior heating mode of the thermal management system shown in FIG. 1. In this instance, description of duplication of the contents of FIGS. 2 and 3 will be omitted.

First, referring to FIG. 4, the compressor 210 is operated. Because of the interior heating, the compressor 210 is operated at low RPM or medium RPM. Continuously, refrigerant of high temperature and high pressure is discharged according to the operation of the compressor 210, and the refrigerant is cooled by exchanging heat with the coolant in the water-cooling condenser 220. On the contrary, the coolant is heated by the refrigerant of the water-cooling condenser 220. Next, the first expander 225 throttles the refrigerant, and the air-cooling condenser 230 evaporates the refrigerant. That is, the water-cooling condenser 220 operates as a condenser, and the air-cooling condenser 230 operates as an evaporator.

Next, the second expander 240 blocks refrigerant flowing toward the evaporator 242. Because of the interior heating, there is no need to use the evaporator 242 used as an evaporator. Moreover, the third expander 251 makes the refrigerant bypass and transfers the refrigerant to the chiller 252. In the chiller 252, the refrigerant absorbs heat of the coolant to be heated. After that, the refrigerant passes the accumulator 260, and is transferred to the compressor 210, so as to repeat the above-mentioned operation and circulate the above cycle.

Meanwhile, the heating line 301 and the cooling line 302 respectively form closed loops of the coolant by the first and second direction changers 420 and 320. The heating line 301 transfers the coolant heated by the water-cooling condenser 220 to the fifth heat exchanger 440 to heat the interior. That is, the heating line 301 heats the interior using the coolant received heat from the refrigerant of high temperature. If the heat received from the refrigerant does not reach a sufficient temperature, the coolant may be heated by the electric heater 430. The cooling line 302 is the closed loop for connecting the battery 350 and the electronic part 460 with each other, and is used as a heating source for warm-up of the battery 350. In this instance, the coolant does not flow to the radiator 310. So, the fan 311 is not operated so that power consumption is reduced. In this instance, heating of the interior means that outside temperature is low and there is little need for means for cooling the battery 350. So, the radiator 310 and the fan 311 are not used. The interior is heated in early winter or late spring, but in situations that outside temperature is not really low, the coolant of the cooling line 302 may be cooled using the radiator 310 and the fan 311.

Moreover, as shown in FIG. 5, the thermal management system according to the present invention can control the third direction changer 360 and the second coolant circulator 340 depending on temperature of the battery 350 in order to block the coolant flows of the battery 350 and the electronic part 460 or reduce a flow rate of the coolant. That is, the thermal management system according to the present invention can reduce power consumption since the second coolant circulator 340 is not operated. Because temperature of the battery is not sufficient high, the thermal management system according to the present invention can block the coolant flow toward the battery 350 under a condition that it is difficult to utilize waste heat of the battery in air-conditioning.

In summary, for interior heating, the coolant heated by the refrigerant of high temperature is used. In addition, the coolant may be heated by the electric heater 430 to heat the interior. The refrigerant circulation line 200 includes a structure to be operated by a heat pump, but the interior heating is achieved not by the refrigerant but by the coolant. Therefore, the air-cooling condenser 230 and the first expander 225 in the refrigerant circulation line 200 may be omitted as occasion demands.

FIG. 6 is a view for explaining an interior heating mode in a mild weather. As shown in FIG. 6, the compressor 210 may not be operated. That is, in the interior heating, the refrigerant does not flow to the refrigerant circulation line 200. Therefore, because the compressor 210 does not operate, power consumption is reduced. The coolant circulation line 300 except the coolant line 302 in which the coolant flows to the radiator 310 and the third connection line 302-3 is all connected in order to distribute the coolant.

The heating sources for heating the interior are the battery 350 and the electronic part 460. Because it is mild outside, there is no need to make the inside temperature high, so it is possible to heat the interior just by the battery 350 and the electronic part 460. For additional heating, the electric heater 430 may be operated.

Furthermore, the battery 350 is warmed up by the electronic part 460. If the temperature of the electronic part 460 cannot sufficiently warm up the battery 350, the electric heater 430 is operated to warm up the battery 350. Warm-up of the battery can increase charging efficiency of the battery when the battery is charged.

To sum up, interior heating is achieved by the coolant heated by waste heat of the battery 350 and the electronic part 460 without any flow of refrigerant. Because the refrigerant circulator 210 does not operate, power consumption is reduced.

Additionally, because the battery 350 is warmed up by the electronic part 460 or the electric heater 430, the initial operation performance of the battery 350 is enhanced.

Finally, the thermal management system according to the embodiment of the present invention has the structure which simplifies the complicated refrigerant line and the complicated coolant line having various heating sources (the electronic part and the battery) and various cooling sources (the radiator, the fan and the chiller) in order to perform not only cooling but also heating (heat pump). Moreover, the thermal management system according to the embodiment of the present invention can be utilized to perform cooling and heating by properly exchanging heat between the refrigerant and the coolant and to cool the heating sources.

The thermal management system according to the embodiment of the present invention can reduce power consumption by blocking power supply to power consumption sources, such as a compressor and a coolant pump, depending on the outside temperature, and enhance mileage of an electric vehicle. Furthermore, the thermal management system according to the embodiment of the present invention can reduce power consumption due to the structure to recover waste heat of the heating sources.

The thermal management system according to the embodiment of the present invention as described above is only the example. Therefore, it will be appreciated by those skilled in the art that various modifications and equivalent other embodiments are possible from the present invention. Therefore, it may be appreciated that the present invention is not limited to the forms mentioned in the above detailed description. For example, the accumulator 260 described in this embodiment may be substituted with a receiver drier arranged between the water-cooling condenser 220, which is a condenser, and a first expander 225.

Additionally, the air-cooling condenser 230 and the first expander 225 may be deleted if necessary. That is, if the water-cooling condenser 220 can sufficiently condense refrigerant, the refrigerant circulation line 200 may include only the compressor, the condenser, the expander and the evaporator. Accordingly, the actual technical protection scope of the present invention must be determined by the spirit of the appended claims. Further, it is to be construed that the present invention includes all the changes, equivalents, and substitutions which are defined in the appending claims.

The invention claimed is:

1. A thermal management system comprising:
a refrigerant circulation line including a refrigerant loop having a compressor, a water-cooling condenser, a first expander, an air-cooling condenser, a second expander and an evaporator, and a third expander and a chiller which are connected with the second expander and the evaporator in parallel in order to circulate refrigerant;

a cooling line in which a radiator exchanging heat with the air to cool coolant, an electronic part, the chiller and a battery are connected in parallel and in which the coolant flows; and a heating line which circulates the coolant heated by exchanging heat with the refrigerant in the water-cooling condenser to heat an interior, and which is connected with the cooling line or blocked from the cooling line according to heating and cooling modes.

2. The thermal management system according to claim 1, wherein in the cooling mode where cooling load is small, the battery and the electronic part are cooled by circulation of the coolant cooled by the radiator.

3. The thermal management system according to claim 1, wherein in the cooling mode where cooling load is large, the battery is cooled by circulation of the coolant cooled by the chiller.

4. The thermal management system according to claim 1, wherein in the cooling mode where cooling load is large, the electronic part is cooled by circulation of the coolant cooled by the radiator.

5. The thermal management system according to claim 1, wherein in the cooling mode, the cooling line and the heating line are connected with each other in a flow of the coolant.

6. The thermal management system according to claim 1, wherein in the heating mode, the cooling line and the heating line are blocked from each other in the flow of the coolant.

7. The thermal management system according to claim 6, wherein in the heating mode in the mild weather, the cooling line and the heating line are connected with each other in a flow of the coolant.

8. The thermal management system according to claim 7, wherein in the heating mode in the mild weather, the interior is heated by the electronic part and the battery of the cooling line.

9. The thermal management system according to claim 8, wherein in the heating mode in the mild weather, a refrigerant flow of the refrigerant circulation line is stopped by a stop of the compressor.

10. The thermal management system according to claim 1, wherein in the cooling mode, the refrigerant of the evaporator exchanges heat with the air in order to cool the interior.

11. The thermal management system according to claim 1, wherein the heating line includes:
  an electric heater for heating the coolant if temperature of the coolant heated by any one among the water-cooling condenser, the battery, and the electric component is less than a predetermined value;
  a heater for exchanging heat between the coolant and the air in order to heat the interior;
  a first direction changer for selectively connecting or blocking the heating line and the cooling line with each other or from each other; and
  a coolant circulator arranged between the heater and the first direction changer to circulate the coolant in the direction of the first direction changer.

12. The thermal management system according to claim 11, further comprising:
  a first connection line connected between the cooling line and the heating line so that the coolant of the cooling line moves to the heating line;
  a second direction changer arranged between the cooling line and the first connection line to control the coolant flow; and
  a third coolant circulator arranged between the second direction changer and the heating line to circulate the coolant in the direction of the heating line.

13. The thermal management system according to claim 12, wherein a second connection line is connected between the first connection line and the cooling line so that the coolant of the first connection line moves to the cooling line, and
  wherein the electronic part is arranged in the second connection line.

14. The thermal management system according to claim 13, further comprising:
  a second coolant circulator arranged between the battery of the cooling line and the second direction changer to circulate the coolant in the direction of the second direction change.

* * * * *